Patented Apr. 13, 1943

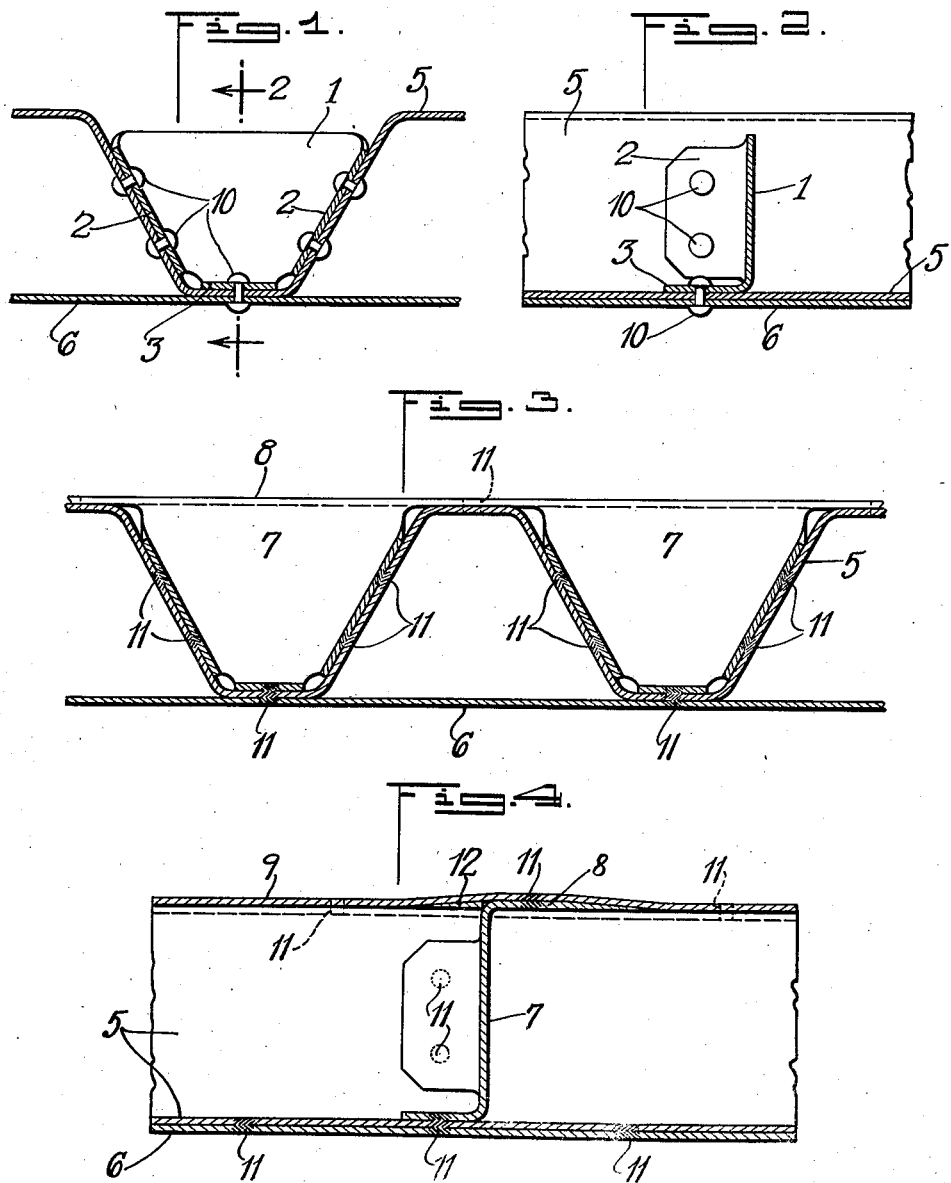

2,316,569

UNITED STATES PATENT OFFICE 2,316,569

CONSTRUCTION MATERIAL FOR AIRCRAFT

Claude Dornier, Friedrichshafen-on-the-Bodensee, Germany; vested in the Alien Property Custodian Application April 18, 1939, Serial No. 268,643
In Germany May 2, 1938

6 Claims. (Cl. 189—34)

The present invention relates to a sheetlike wall or skin construction material for aircraft.

Reinforcement of plain thin material by means of corrugated sheeting acts only in one direction as long as only one corrugated sheet is applied. Use of two corrugated sheets with the corrugations disposed cross-wise increases the weight and thickness too much for use in aircraft construction.

The construction elements according to the present invention are light, thin, and of equal thickness. Corrugated sheets are used having transverse reinforcements which are fully or almost completely disposed within the hollow or trough parts of the corrugated sheet. The simplest form of such transverse reinforcements is that of gussets which are individually transversely and in rows inserted into the corrugations and which may be rigidly connected with the sides and the bottom of the corrugations by means of rivets, soldering, welding or other suitable means or process. The gussets may be provided with suitable borders for this purpose. Alternatively a plurality of gussets may be interconnected by strips of material disposed above the troughs of the corrugated material whereby the strip and the plurality of gussets extending therefrom may be made of the same piece of material. This construction assures proper distribution of stresses and facilitates connection of the plain covering material with the gussets or transverse reinforcements. The strip interconnecting the individual reinforcements may have sharpened edges or wedge shaped filling members may be disposed adjacent to said strips so that a smooth and practically plain outside surface of the construction element is obtained.

Further and other objects and advantages of the present invention will be apparent from the accompanying specification and claims and shown in the drawing which, by way of illustration, shows what I now consider to be a preferred embodiment of my invention.

In the drawing:

Figure 1 is a sectional view taken transversely to the corrugations of a construction element according to the present invention.

Figure 2 is a sectional view taken parallel to the corrugations of the construction element shown in Figure 1 and taken along line 2—2 in Figure 1.

Figure 3 is a sectional view taken transversely to the corrugations of a modified construction element according to the present invention.

Figure 4 is a sectional view taken parallel to the corrugations of another modification of a construction element according to the present invention.

Like parts are designated by like numerals in all figures of the drawing.

Referring more particularly to Figures 1 and 2, 5 represents the corrugated sheet and 6 the plain surface sheet. In the troughs of the corrugated sheet transversely reinforcing flaps or gussets 1 are inserted having borders 2 at the sides and a border 3 at the bottom which borders are rigidly connected with the corrugated sheet. In the embodiment of the invention shown in Figures 1 and 2, rivets 10 are used for this purpose. The bottom of the gusset is also connected with the surface sheet 6 whereby, simultaneously, a rigid connection of the corrugated sheet 5 and of the surface forming sheet 6 is produced.

In the construction illustrated in Figures 3 and 4, the gussets 7 depend from and are part of a transverse strip 8 which rests on and is rigidly connected with the crests of the corrugations of the corrugated sheet 5. The gussets 7 may also be provided with borders at the sides and the extreme end and be connected with the corrugated sheet 5 and the surface forming sheet 6 as is the case in the construction shown in Figures 1 and 2. Spot weldings 11 or solderings are used in the construction shown in Figures 3 and 4 instead of rivets.

Figure 4 shows also a plain surface forming sheet 9 at the top of the element. In order to make the top surface smooth the side of the strip 8 is thinned out and a wedge shaped filling member 12 is provided.

While I believe the above described embodiments of my invention to be preferred embodiments, I wish it to be understood that I do not desire to be limited to the exact details of design and construction shown and described, for obvious modifications will occur to a person skilled in the art.

I claim:

1. A sheetlike skin construction material for aircraft comprising a corrugated sheet, a surface forming sheet directly rigidly connected with said corrugated sheet, and a plurality of transverse reinforcements individually consisting of a strip of material disposed directly adjacent to and flatly across the crests of the corrugations of said corrugated sheet and having a plurality of flap like extensions individually extending into the troughs of said corrugated sheet.

2. A sheetlike skin construction material for aircraft comprising a corrugated sheet, a surface forming sheet directly rigidly connected with said corrugated sheet, and a plurality of transverse reinforcements individually consisting of a strip of material disposed directly adjacent to and flatly across the crests of the corrugations of said corrugated sheet and having a plurality of extensions individually extending into the troughs of said corrugated sheet and being rigidly connected therewith.

3. A sheetlike construction material for aircraft comprising a corrugated sheet, a plurality of transverse reinforcements individually consisting of a strip of material disposed across the corrugations of said corrugated sheet and having a plurality of flap members individually extending into the troughs of said corrugated sheet, a surface forming sheet disposed outside of said strips and parallel to said corrugated sheet and rigidly connected with the crests of the corrugations thereof, and wedge shaped elements associated with said strips providing a smooth support for said surface forming sheet adjacent to said strips.

4. A sheetlike skin construction material for aircraft comprising a corrugated sheet, a surface forming sheet directly rigidly connected with one side of said corrugated sheet, and a plurality of transverse reinforcements individually consisting of a strip of material disposed directly adjacent to and flatly across the crests of the corrugations of the other side of said corrugated sheet and having a plurality of extensions individually extending into the troughs of said corrugated sheet and being rigidly connected therewith, and another surface forming sheet directly rigidly connected with that side of said corrugated sheet on which said transverse reinforcements are disposed.

5. A sheetlike skin construction material for aircraft comprising a corrugated sheet, a plurality of transverse reinforcements individually consisting of a flat strip of material disposed flatly across and flatly abutting and rigidly connected with the crests of the corrugations of said corrugated sheet and having a plurality of full flap like extensions individually extending into the troughs of said corrugated sheet.

6. A sheetlike construction material for aircraft comprising a corrugated sheet, a plurality of transverse reinforcements individually consisting of a flat strip of material disposed across and in contact with the crest portions of the corrugations of said corrugated sheet and having a plurality of flap members individually extending into the troughs of said corrugated sheet, and a surface forming sheet disposed outside of said strips and parallel to said corrugated sheet and rigidly connected with the crests of the corrugations thereof.

CLAUDE DORNIER.